(12) United States Patent
Matsushita (10) Patent No.: US 7,668,324 B2
(45) Date of Patent: Feb. 23, 2010

(54) FOLDING ELECTRONIC DEVICE (75) Inventor: Akimasa Matsushita, Saitama (JP)

(73) Assignee: NEC Corporation, Tokyo (JP)

( * ) Notice: Subject to any disclaimer, the term of this patent is extended or adjusted under 35 U.S.C. 154(b) by 988 days.

(21) Appl. No.: 11/054,425

(22) Filed: Feb. 10, 2005

(65) Prior Publication Data
US 2005/0187645 A1 Aug. 25, 2005

(30) Foreign Application Priority Data
Feb. 20, 2004 (JP) ............................. 2004-045362

(51) Int. Cl.
H04R 5/02 (2006.01)
H04B 3/00 (2006.01)
(52) U.S. Cl. .......................... 381/306; 381/81; 381/123
(58) Field of Classification Search ................. 381/300, 381/306, 333, 388, 58, 123, 80, 81; 455/575, 455/90, 350, 355, 575.1–575.3, 90.1–90.3
See application file for complete search history.

(56) References Cited

U.S. PATENT DOCUMENTS

| 5,214,514 | A | | 5/1993 | Haberkern |
| 5,986,634 | A | * | 11/1999 | Alioshin et al. ............. 345/649 |
| 6,470,087 | B1 | | 10/2002 | Heo et al. |
| 7,369,907 | B2 | * | 5/2008 | Hibino et al. ................. 700/94 |
| 2002/0181722 | A1 | | 12/2002 | Hibino et al. |

FOREIGN PATENT DOCUMENTS

| CN | 1179074 A | 4/1998 |
| CN | 1392974 A | 1/2003 |
| JP | 2001-177609 | 5/2001 |
| JP | 2001177609 | 6/2001 |
| JP | 2002-078073 | 3/2002 |
| JP | 2002078073 | 3/2002 |
| JP | 2002-123333 A | 4/2002 |
| JP | 2003-078601 A | 3/2003 |
| JP | 2003-216154 A | 7/2003 |
| JP | 2003198696 | 7/2003 |
| JP | 2004056408 | 2/2004 |
| JP | 2005-0867398 A | 3/2005 |

* cited by examiner

Primary Examiner—Xu Mei
(74) Attorney, Agent, or Firm—Foley & Lardner LLP (57) ABSTRACT A folding electronic device includes an operation unit, a display unit, a memory unit, a pair of speakers, a detection switch, and a switch. A plurality of information input keys are arranged on the operation unit. The display unit is integrated with the operation unit so as to be foldable, and displays at least image information. Sound source data is stored in the memory unit. A pair of speakers for a left channel and a right channel can be driven in a closed state in which the display unit is folded. The detection switch detects the open state in which the display unit is not folded or the closed state in which the display unit is folded. The switch switches paths through which the sound source data stored in the memory unit is output to the pair of speakers on the basis of an output from the detection switch.

12 Claims, 8 Drawing Sheets

FOLDING ELECTRONIC DEVICE

BACKGROUND OF THE INVENTION

The present invention relates to a folding electronic device and, more particularly, to a folding electronic device including left- and right-channel speakers which can be driven independently.

For the purpose of improving portability, most types of portable electronic devices (to be also simply referred to as electronic devices hereinafter) such as cellular phones are configured such that a display unit which displays character information or image information and an operation unit on which keys for information input are arranged are integrated into a foldable unit. As disclosed in Japanese Patent Laid-Open No. 2001-177609 (reference 1), some current folding cellular phones have a music function as well as a telephone function.

Of cellular phones with a music function, popular cellular phones are those which include left- and right-channel speakers which can be driven independently and are designed to improve acoustic quality by outputting stereo sounds. A folding cellular phone having such an arrangement allows the user to enjoy stereo sounds while watching images on the display unit by driving the left- and right-channel speakers even in the closed state of the cellular phone in which it is folded as well as in the open state in which the cellular phone is not folded.

Figure 7:
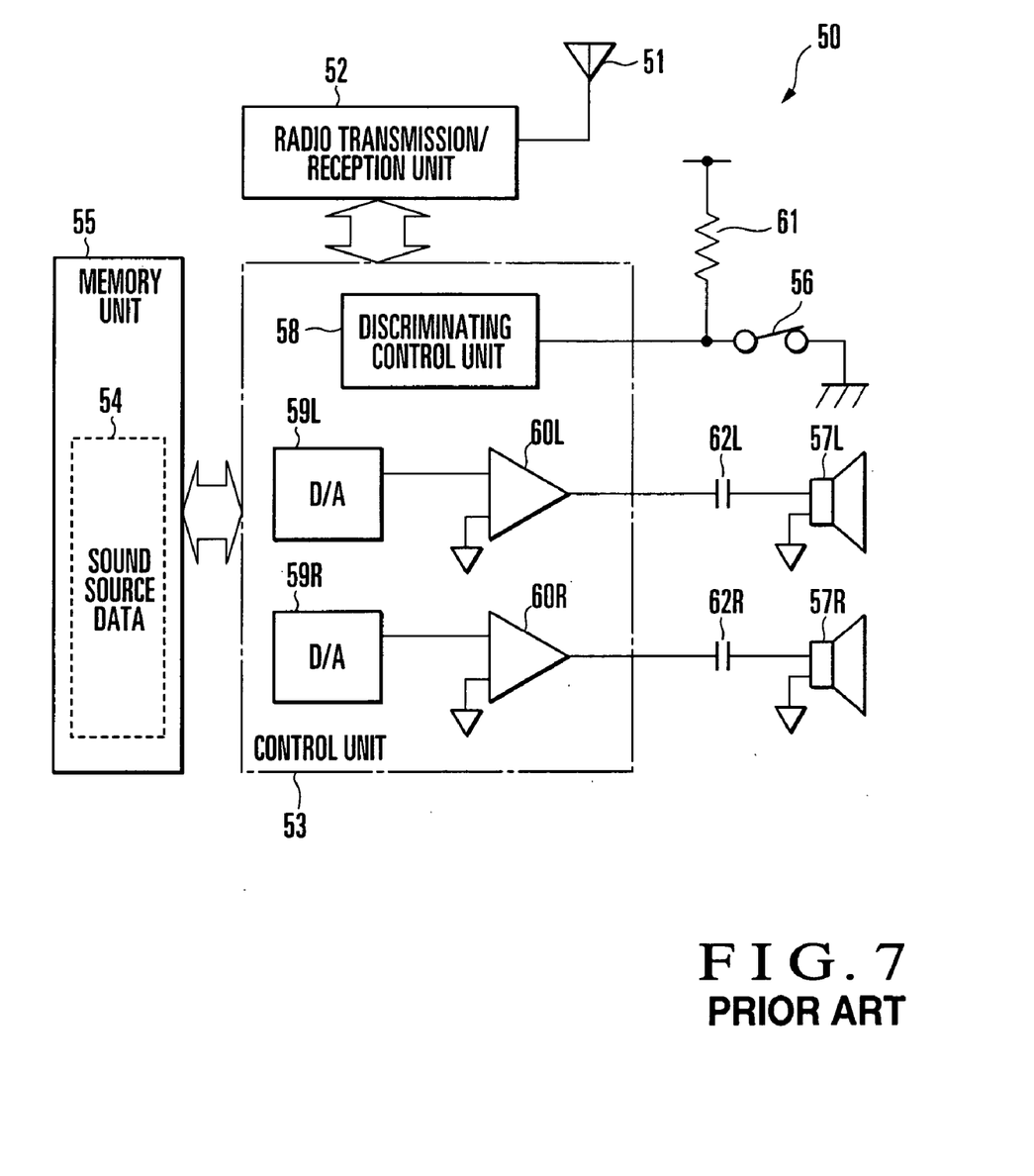
FIG. 7 is a block diagram showing a conventional folding electronic device.

As shown in FIG. 7, a conventional folding cellular phone 50 having left- and right-channel speakers which can be driven independently includes a radio transmission/reception unit 52 which transmits/receives radio signals through an extendible transmission/reception antenna 51, a control unit 53 which forms the main part of the cellular phone 50, a memory unit 55 which stores external sound source data downloaded through the radio transmission/reception unit 52, internal sound source data, and the like as sound source data 54, a detection switch 56 which detects the open or closed state of the cellular phone 50, and a left (L)-channel speaker 57L and right (R)-channel speaker 57R which can be driven independently.

The control unit 53 is comprised of a switching control unit 58 formed of a CPU (Central Processing Unit) which controls the switching operation of a switch (to be described later) in accordance with the detection result obtained by the detection switch 56, a left-channel DA (Digital to Analog) converter 59L and right-channel DA converter 59R which convert the sound source data 54 stored in the memory unit 55 into analog data, and a left-channel amplifier 60L and right-channel amplifier 60R which respectively amplify outputs from the DA converters 59L and 59R. Reference numeral 61 denotes a pull-up resistor connected to a power supply; and 62L and 62R, capacitors.

Figure 8:
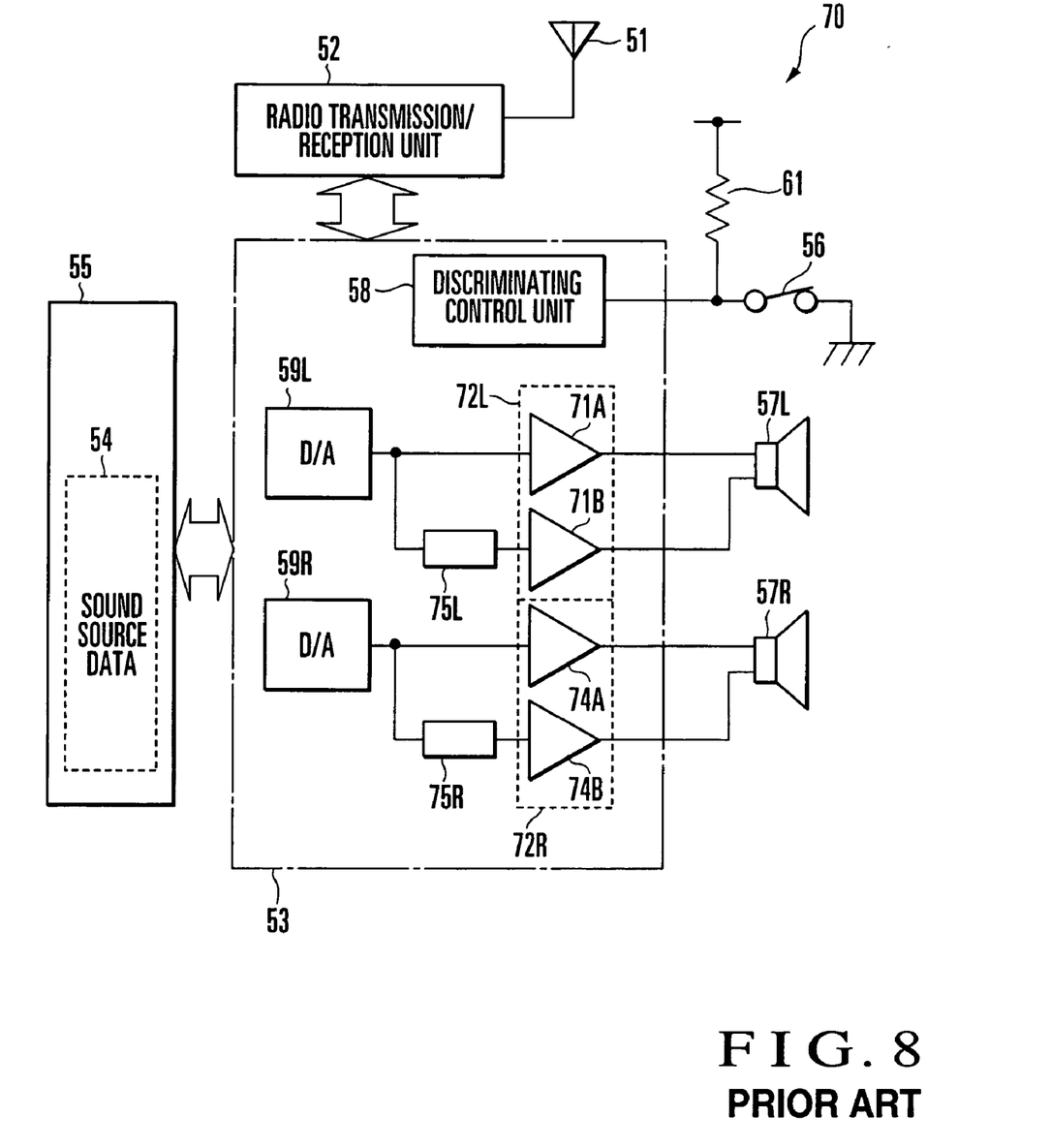
FIG. 8 is a block diagram showing another example of a conventional folding electronic device.

FIG. 8 shows another conventional cellular phone having left- and right-channel amplifiers formed of BTL (Balanced Transformerless Amplifier) amplifiers. A folding cellular phone 70 includes a left-channel BTL amplifier 72L and right-channel BTL amplifier 72R. The BTL amplifier 72L is comprised of first and second amplifiers 71A and 71B which amplify an output from the left-channel DA converter 59L. The BTL amplifier 72R is comprised of third and fourth amplifiers 74A and 74B which amplify an output from the right-channel DA converter 59R. Phase inversion circuits 75L and 75R are respectively connected to the input terminals of the amplifier 71B of the BTL amplifier 72L and the amplifier 74B of the BTL amplifier 72R. Except for this, the arrangement of this cellular phone is almost the same as that shown in FIG. 7. Therefore, the same reference numerals as in FIG. 7 denote the same components in FIG. 8, and a description thereof will be omitted.

In the conventional folding cellular phones 50 and 70 shown in FIGS. 7 and 8, sounds output from the speakers 57L and 57R flow in laterally opposite directions in the open state and closed state. This results in unnatural sound reproduction in terms of human hearing sense. More specifically, in the open state, stereo sounds are output from the speakers 57L and 57R in synchronism with images on the display unit, and hence natural sounds can be produced in terms of human hearing sense like sounds produced when a car passes by. In the closed state, however, since the positions of the speakers 57L and 57R become laterally opposite to those in the open state, output stereo sounds are not synchronized with images. For this reason, the sounds inevitably become unnatural in terms of human hearing sense.

Figure 9A:
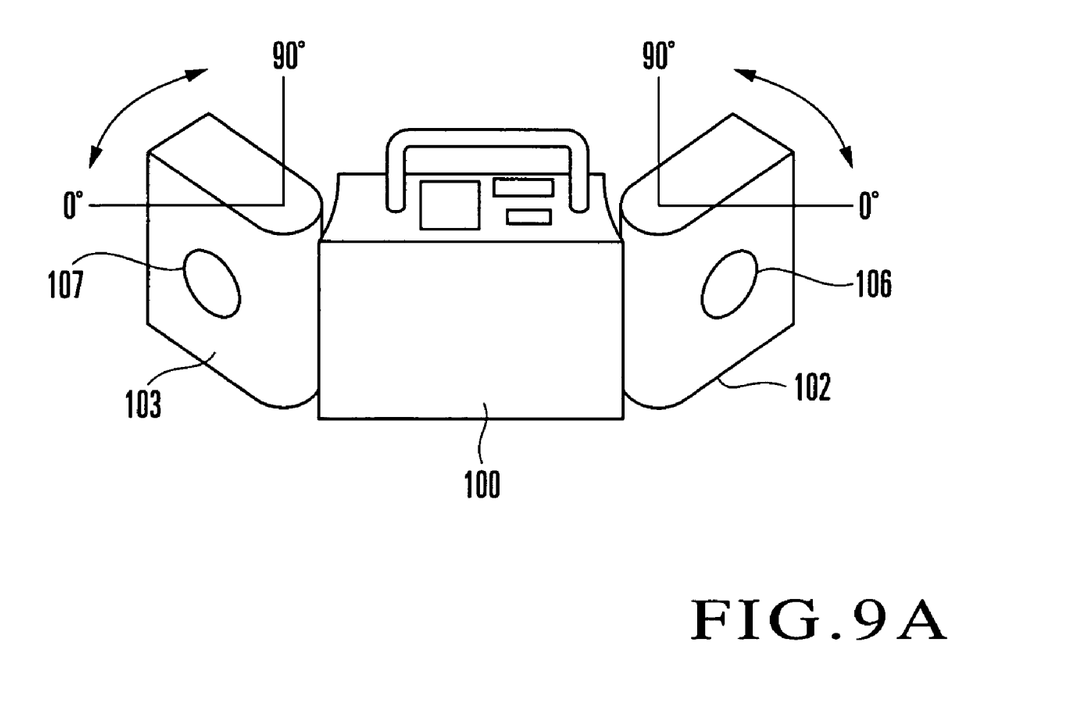
FIGS. 9A and 9B are perspective views respectively showing a state in which the speaker boxes of a conventional folding electronic device are open, and a state in which the speaker boxes are closed.
Figure 9B:
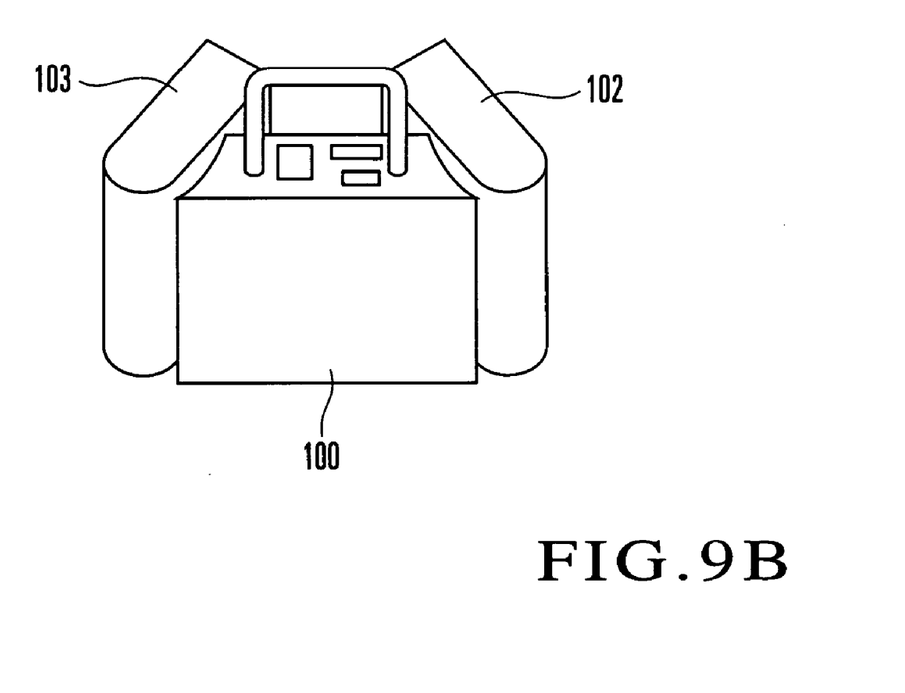

An audio set designed to improve such unnaturalness in terms of human hearing sense is disclosed in, for example, Japanese Patent Laid-Open No. 2002-78073 (reference 2). As shown in FIG. 9A, in the audio set disclosed in reference 2, a main body 100 includes left and right speaker boxes 103 and 102 respectively housing speakers 107 and 106, which are provided on side surfaces of the main body so as to be pivotal in the back-and-forth direction as indicated by the arrows. This audio set is provided with an angle detection means (not shown) for detecting a state in which the boxes 103 and 102 pivot backward through 90° or more as shown in FIG. 9B. In such an arrangement, when the angle detection means detects that both the left and right speaker boxes 103 and 102 have pivoted backward through 90° or more, drive signals to the speakers 107 and 106 are interchanged.

In the audio set disclosed in reference 2, since control is made to interchange drive signals to the speakers 107 and 106 when the angle detection means mechanically detects that the speakers 107 and 106 have pivoted through a predetermined angle or more, the control becomes complicated. In addition, since this set requires the speaker boxes 103 and 102 housing the speakers 107 and 106, it is difficult to apply this technique to folding electronic devices like folding cellular phones which are required to satisfy conditions for excellent portability in terms of size, weight, and the like.

These problems will be described in detail. In the audio set disclosed in reference 2, the speaker boxes 103 and 102 are configured to pivot backward through 90° or more from the open state to the closed state. For this reason, only when the speaker boxes 103 and 102 have pivoted through 90° or more, drive signals to the speakers 107 and 106 must be interchanged. This complicates the control.

The audio set disclosed in reference 2 is directed to an electronic device which is not required to have portability in terms of size, weight, and the like and allowed to include the speaker boxes 103 and 102 housing the speakers 107 and 106. It is difficult for an electronic device required to satisfy conditions for excellent portability in terms of size, weight, and the like to include the speaker boxes 103 and 102 housing the speakers 107 and 106. Even if a device includes the speaker boxes 103 and 102, it is practically impossible to pivot the speaker boxes 103 and 102 to the back side of the main body.

SUMMARY OF THE INVENTION

It is an object of the present invention to provide a folding electronic device which can achieve natural sound reproduction in terms of human hearing sense even when left and right speakers are set in the closed state.

In order to achieve the above object, according to the present invention, there is provided a folding electronic device comprising an operation unit on which a plurality of information input keys are arranged, a display unit which is integrated with the operation unit so as to be foldable, and displays at least image information, a memory unit in which sound source data is stored, a pair of speakers for a left channel and a right channel which can be driven in a closed state in which the display unit is folded, a detection switch which detects an open state in which the display unit is not folded or the closed state in which the display unit is folded, and a switch which switches paths through which the sound source data stored in the memory unit is output to the pair of speakers on the basis of an output from the detection switch.

DESCRIPTION OF THE PREFERRED EMBODIMENTS

A folding electronic device according to the first embodiment of the present invention will be described with reference to FIGS. 1 to 3. In this embodiment, a cellular phone will be described as an example of the electronic device.

Figure 1:
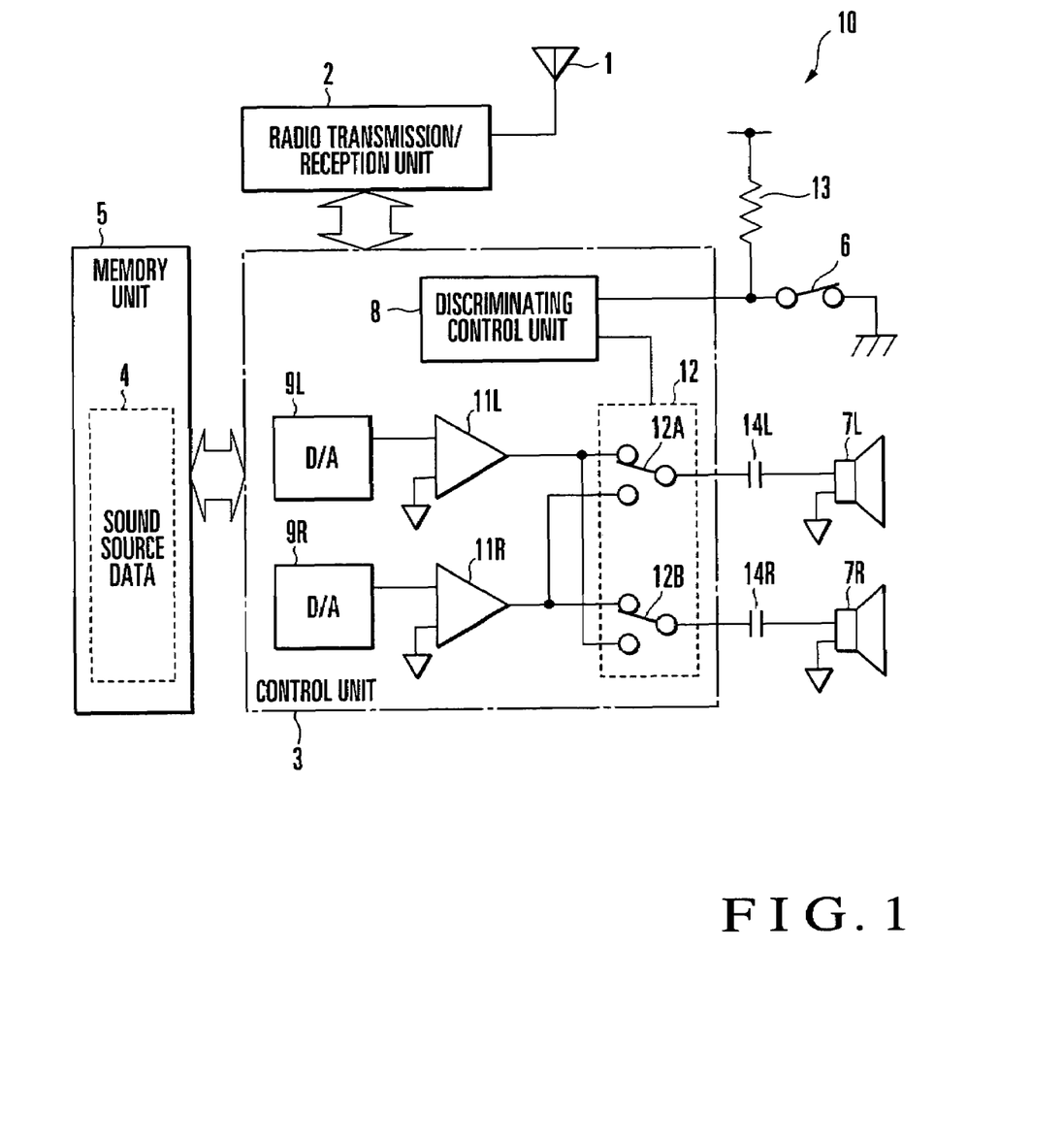
FIG. 1 is a block diagram showing the arrangement of a folding electronic device according to the first embodiment of the present invention.

As shown in FIG. 1, a folding cellular phone 10 according to this embodiment includes a radio transmission/reception unit 2 which transmits/receives radio signals through an extendible transmission/reception antenna 1, a control unit 3 which forms the main part of the folding cellular phone 10, a memory unit 5 which stores external sound source data downloaded by the radio transmission/reception unit 2, internal sound source data, and the like as sound source data 4, a detection switch 6 which detects the open state or closed state of the cellular phone 10, and a left (L)-channel speaker 7L and right (R)-channel speaker 7R which are provided on the left and right sides of the lower portion of a display unit (to be described later) and can be driven independently.

The control unit 3 is comprised of a switching control unit 8 formed of a CPU which controls the switching operation of a switch (to be described later) in accordance with the detection result obtained by the detection switch 6, a left-channel DA converter 9L and right-channel DA converter 9R which convert the sound source data 4 stored in the memory unit 5 into analog data, a left-channel amplifier 11L and right-channel amplifier 11R which respectively amplify outputs from the DA converters 9L and 9R, and a switch 12 which is controlled by the switching control unit 8 to perform switching operation of selectively connecting the outputs of the amplifiers 11L and 11R to the speakers 7L and 7R or the speakers 7R and 7L.

The switch 12 is connected between the amplifiers 11L and 11R and the speakers 7L and 7R and includes a first movable contact piece 12A which is normally connected to the speaker 7L, and a second movable contact piece 12B which is normally connected to the speaker 7R. Reference numeral 13 denotes a pull-up resistor connected to a power supply; 14L, a left-channel capacitor connected between the movable contact piece 12A and the speaker 7L; and 14R, a right-channel capacitor connected between the movable contact piece 12B and the speaker 7R.

The operation of the folding cellular phone 10 having the above arrangement will be described next.

<Open State>

As shown in FIG. 1, when the detection switch 6 detects the open state of the folding cellular phone 10, the switching control unit 8 performs control to connect the movable contact pieces 12A and 12B of the switch 12 to the amplifiers 11L and 11R, respectively. This forms a path through which the output of the DA converter 9L is connected to the speaker 7L through the amplifier 11L and the movable contact piece 12A of the switch 12. A path is also formed through which the output of the DA converter 9R is connected to the speaker 7R through the amplifier 11R and the movable contact piece 12B of the switch 12.

Figure 2:
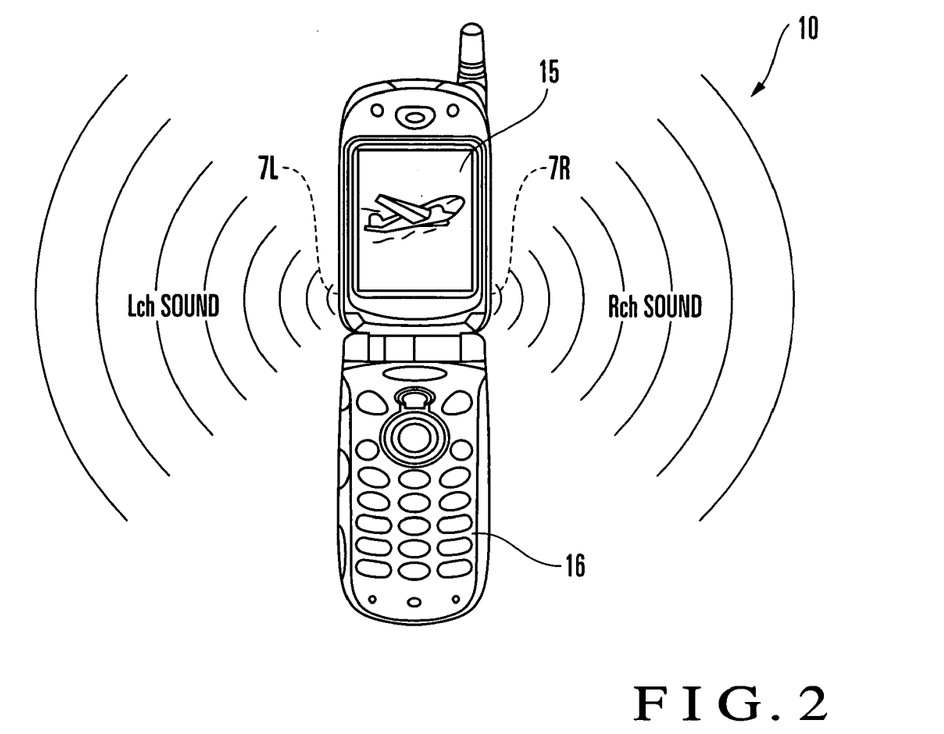
FIG. 2 is a plan view showing the open state of the electronic device shown in FIG. 1.

As shown in FIG. 2, the folding cellular phone 10 of this embodiment is configured such that a display unit 15 and operation unit 16 are integrated into a foldable unit, and includes the speakers 7L and 7R which can be driven independently, as described above. The foldable display unit 15 has two display surfaces 15a and 15b on the inner surface side (the inner side in the folded state) and the outer surface side (the outer side in the folded state). Identical images are simultaneously displayed or switched/displayed on the display surfaces 15a and 15b. In this case, the images on the display surfaces 15a and 15b are rightside left.

In the folding cellular phone 10 having the above arrangement, sounds are output from the speakers 7L and 7R in synchronism with images on the display unit 15. For this reason, stereo sounds matching images on the display surface 15a can be obtained from the speakers 7L and 7R, and hence natural sounds can be produced in terms of human hearing sense.

<Closed State>

When the detection switch 6 detects the closed state of the cellular phone, the switching control unit 8 performs control to connect the movable contact pieces 12A and 12B of the switch 12 to the amplifiers 11R and 11L, respectively. This forms a path through which the output of the DA converter 9L is connected to the speaker 7R through the amplifier 11L and the movable contact piece 12B of the switch 12. A path is also formed through which the output of the DA converter 9R is connected to the speaker 7L through the amplifier 11R and the movable contact piece 12A of the switch 12.

Figure 3:
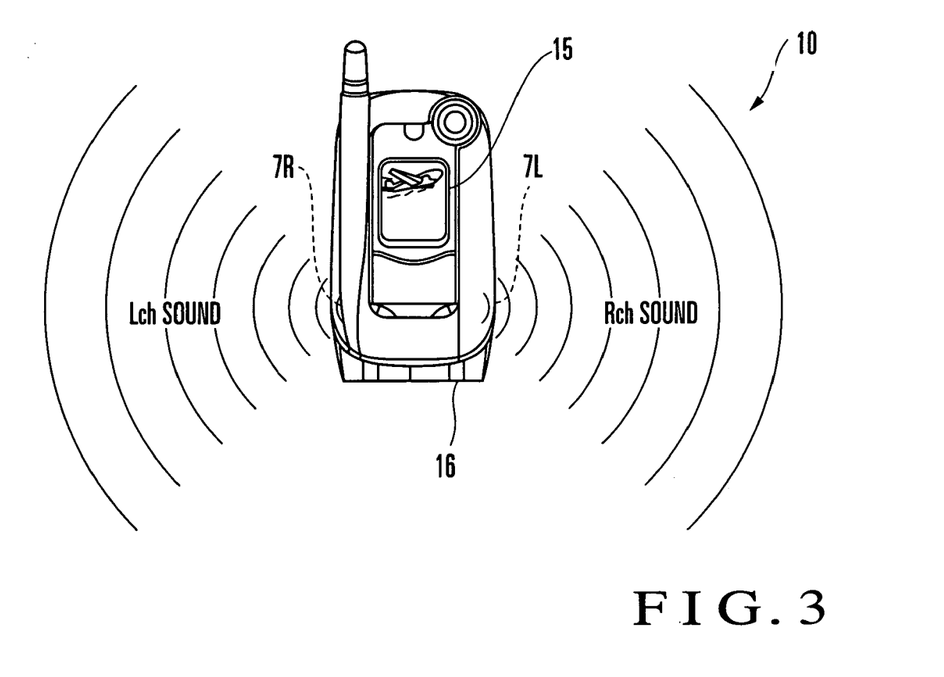
FIG. 3 is a plan view showing the closed state of the electronic device shown in FIG. 1.

As shown in FIG. 3, therefore, in the folding cellular phone 10, even if the positions of the speakers 7L and 7R become laterally opposite to those in the open state, right- and left-channel sounds are output from the speakers 7L and 7R, respectively, in synchronism with images on the display unit

15. For this reason, stereo sounds matching images on the display surface 15b can be obtained from the speakers 7L and 7R, and hence natural sounds can be produced in terms of human hearing sense as in the open state.

The folding cellular phone of this embodiment is configured such that the display unit and operation unit are integrated into a foldable unit, and includes the left- and right-channel speakers which can be driven independently. According to this embodiment, since outputs from the speakers 7L and 7R are laterally switched in the open state and the closed state, stereo sounds synchronized with images are output even in the closed state as in the open state. Therefore, natural sounds can be produced in terms of human hearing sense.

A folding electronic device according to the second embodiment of the present invention will be described next with reference to FIG. 4.

The folding electronic device of this embodiment differs from that of the first embodiment in that a switch is connected between DA converters 9L and 9R and amplifiers 11L and 11R. In this embodiment as well, a cellular phone will be described as an example of the electronic device.

Figure 4:
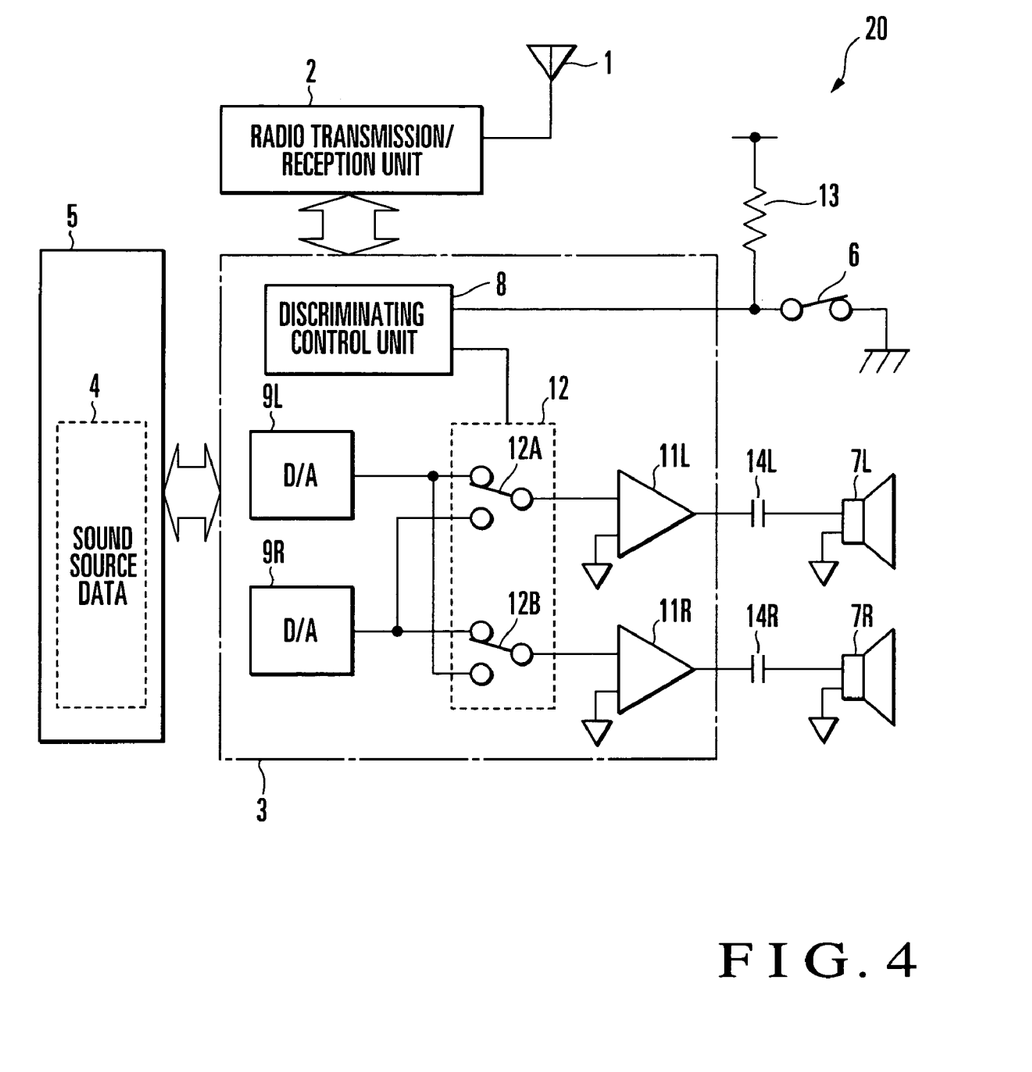
FIG. 4 is a block diagram showing the arrangement of a folding electronic device according to the second embodiment of the present invention.

As shown in FIG. 4, in a folding cellular phone 20 of this embodiment, a switch 12 is connected to the input stages of the channel amplifiers 11L and 11R. That is, the switch 12 switches and connects the DA converters 9L and 9R to the amplifiers 11L and 11R under the control of the switching control unit 8. With this operation, outputs from the DA converters 9L and 9R are switched and output from speakers 7L and 7R through the amplifiers 11L and 11R.

Except for this, the arrangement of this embodiment is the same as that of the first embodiment. Therefore, the same reference numerals as in FIG. 1 denote the same parts in FIG. 4, and a description thereof will be omitted.

A folding electronic device according to the third embodiment of the present invention will be described next with reference to FIG. 5. The folding electronic device of this embodiment differs from that of the first embodiment in that amplifiers are formed of BTL amplifiers.

Figure 5:
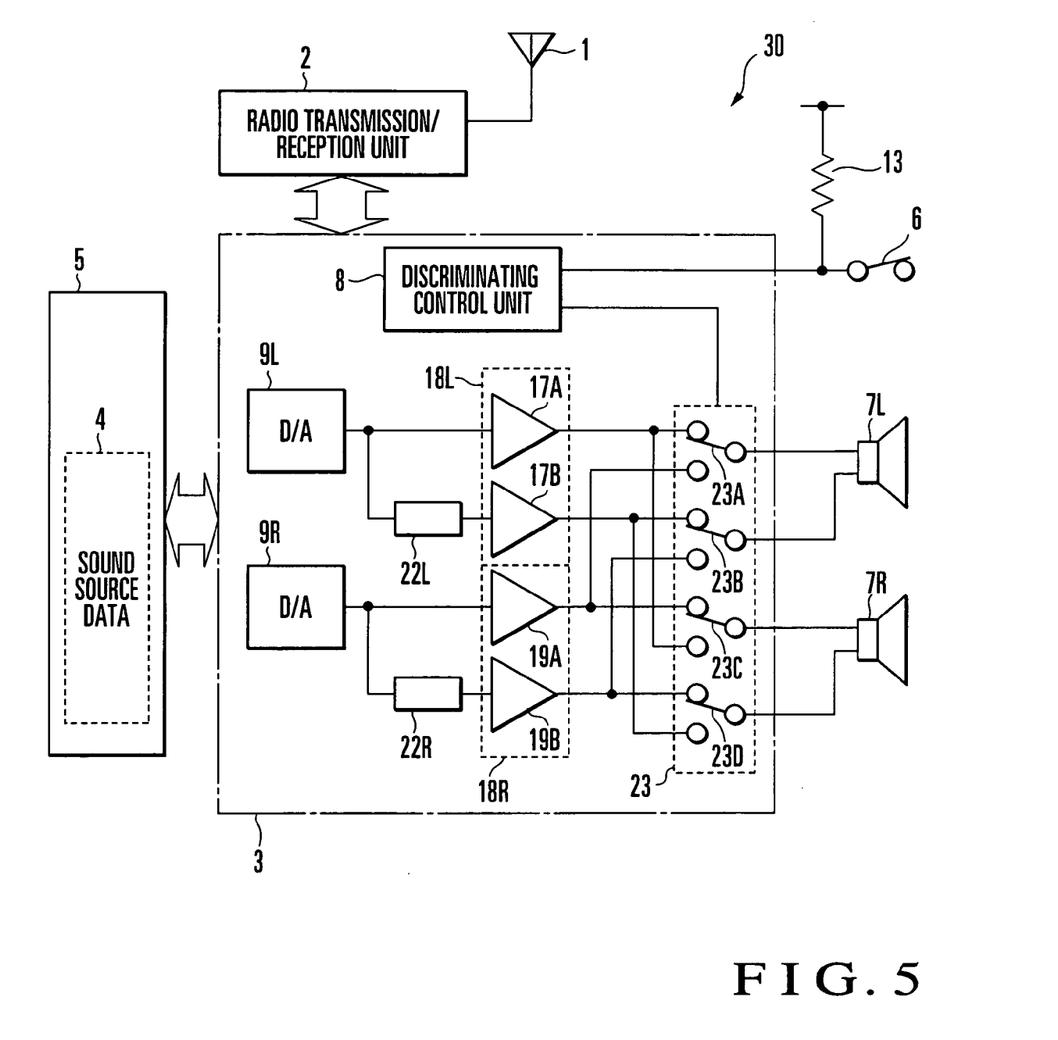
FIG. 5 is a block diagram showing the arrangement of a folding electronic device according to the third embodiment of the present invention.

As shown in FIG. 5, a folding cellular phone 30 according to this embodiment includes a left-channel BTL amplifier 18L comprised of a pair of parallel-connected amplifiers 17A and 17B which amplify an output from a DA converter 9L, and a right-channel BTL amplifier 18R comprised of a pair of parallel-connected amplifiers 19A and 19B which amplify an output from a DA converter 9R. Phase inversion circuits 22L and 22R are respectively connected to the input stage of the parallel-connected amplifier 17B of the BTL amplifier 18L and the input stage of the parallel-connected amplifier 19B of the BTL amplifier 18R.

A switch 23 controlled by a switching control unit 8 has a first movable contact piece 23A and second movable contact piece 23B which are normally connected to a speaker 7L, and a third movable contact piece 23C and fourth movable contact piece 23D which are normally connected to a speaker 7R. The movable contact pieces 23A and 23C are switched to select either the amplifier 17A of the BTL amplifier 18L or the amplifier 19A of the BTL amplifier 18L. The movable contact pieces 23B and 23D are switched to select either the amplifier 17B of the BTL amplifier 18L or the amplifier 19B of the BTL amplifier 18R.

In the BTL amplifiers 18L and 18R, voltages applied to the loads are doubled according to the driving scheme for the amplifiers. Therefore, the amplifiers can supply four-fold output power. This makes it possible to obtain a large output with a low power supply voltage.

The operation of the folding cellular phone 30 having the above arrangement will be described next.

<Open State>

As shown in FIG. 5, when a detection switch 6 detects the open state of the cellular phone, the switching control unit 8 performs control to connect the movable contact pieces 23A and 23B of the switch 23 to the amplifiers 17A and 17B of the BTL amplifier 18L, respectively. The switching control unit 8 also performs control to connect the movable contact pieces 23C and 23D to the amplifiers 19A and 19B of the BTL amplifier 18R. This forms a path through which the output of the DA converter 9L is connected to the speaker 7L through the BTL amplifier 18L and the movable contact pieces 23A and 23B of the switch 23. A path is also formed through which the output of the DA converter 9R is connected to the speaker 7R through the BTL amplifier 18R and the movable contact pieces 23C and 23D of the switch 23.

As shown in FIG. 2, therefore, left- and right-channel sounds are output from the speakers 7L and 7R, respectively, in synchronism with images on a display surface 15a of a display unit 15. Since stereo sounds matching images can be obtained from the speakers 7L and 7R in this manner, natural sounds can be produced in terms of human hearing sense.

<Closed State>

When a detection switch 6 detects the closed state of the cellular phone, the switching control unit 8 performs control to connect the movable contact pieces 23A and 23B of the switch 23 to the amplifiers 19A and 19B of the BTL amplifier 18R, respectively. The switching control unit 8 also performs control to connect the movable contact pieces 23C and 23D to the amplifiers 17A and 17B of the BTL amplifier 18L. This forms a path through which the output of the DA converter 9L is connected to the speaker 7R through the BTL amplifier 18L and the movable contact pieces 23C and 23D of the switch 23. A path is also formed through which the output of the DA converter 9R is connected to the speaker 7L through the BTL amplifier 18R and the movable contact pieces 23A and 23B of the switch 23.

As shown in FIG. 3, even if the positions of the speakers 7L and 7R become laterally opposite to those in the open state, right- and left-channel sounds are output from the speakers 7L and 7R in synchronism with images on a display surface 15b of the display unit 15. Since stereo sounds matching images can be obtained from the speakers 7L and 7R, natural sounds can be produced in terms of human hearing sense as in the open state.

Except for this, the arrangement of this embodiment is the same as that of the first embodiment. Therefore, the same reference numerals as in FIG. 1 denote the same parts in FIG. 5, and a description thereof will be omitted. According to this embodiment, effects similar to those of the first embodiment can be obtained. In addition, according to this embodiment, since BTL amplifiers are used, a large output can be obtained with a low power supply voltage.

A folding electronic device according to the fourth embodiment of the present invention will be described next with reference to FIG. 6. The folding electronic device according to this embodiment differs from that of the third embodiment in that a switch is connected to the input stage of each amplifier.

Figure 6:
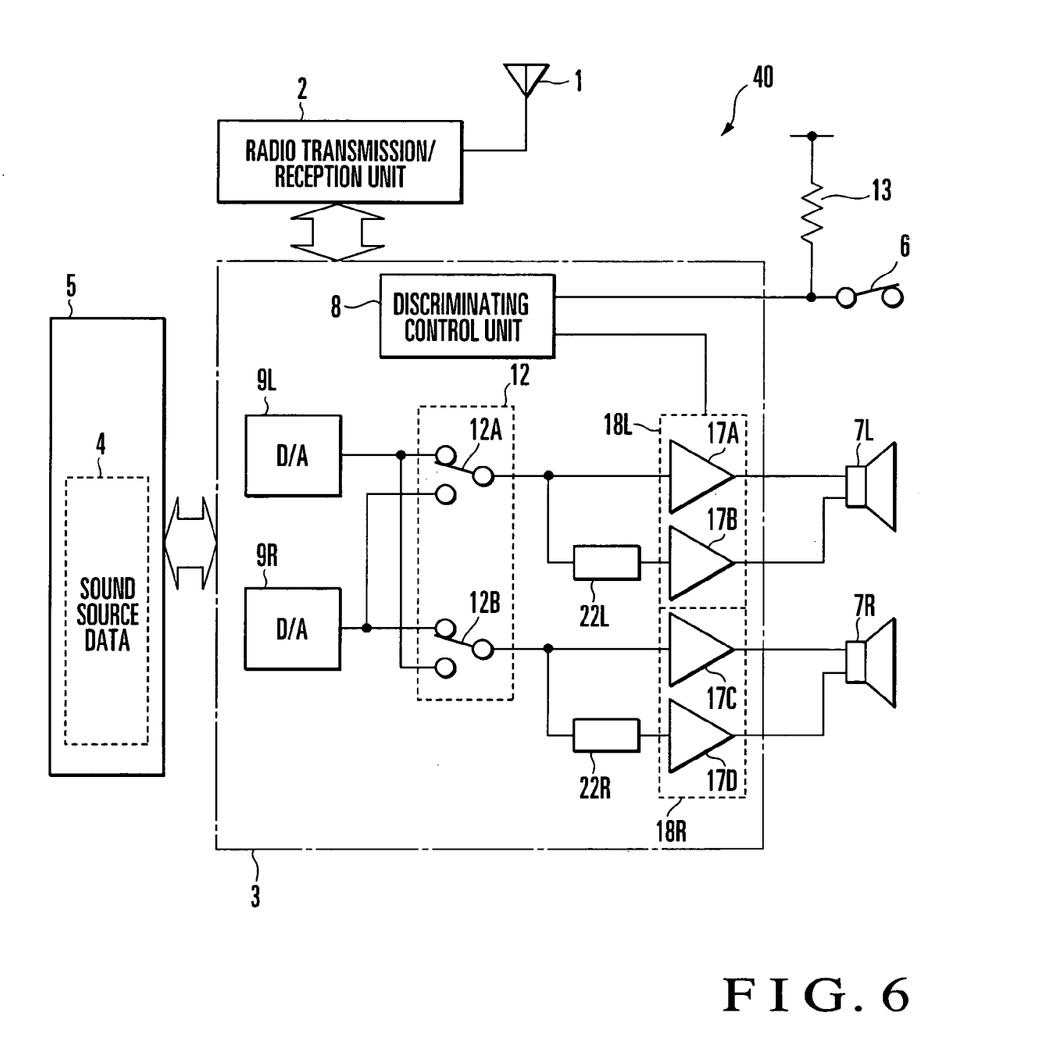
FIG. 6 is a block diagram showing the arrangement of a folding electronic device according to the fourth embodiment of the present invention.

As shown in FIG. 6, in a folding cellular phone 40 according to this embodiment, a switch 12 is connected to the input stages of BTL amplifiers 18L and 18R. That is, the switch 12 switches and connects DA converters 9L and 9R to the BTL amplifiers 18L and 18R under the control of a switching control unit 8. With this operation, outputs from the DA converters 9L and 9R are switched and output to speakers 7L and 7R through the BTL amplifiers 18L and 18R.

Except for this, the arrangement of this embodiment is the same as that of the third embodiment. Therefore, the same reference numerals as in FIG. 5 denote the same parts in FIG. 6, and a description thereof will be omitted. According to this embodiment, effects similar to those of the third embodiment can be obtained.

Although the embodiments of the present invention have been described in detail above with reference to the accompanying drawings, specific arrangements are not limited to the embodiments, and the present invention incorporates changes in design and the like within the spirit and scope of the present invention. For example, in each embodiment, the present invention is applied to a cellular phone. However, the present invention is not limited to cellular phones and can be applied to electronic devices in general, e.g., PDAs (Personal Digital Assistants) and portable GPS (Global Positioning Systems).

As has been described above, according to the present invention, in an electronic device which is configured such that a display unit and operation unit are integrated into a foldable unit, and includes left- and right-channel speakers which can be driven independently, stereo sounds synchronized with images on a display surface are output even in the closed state in the same manner as in the open state, thereby producing natural sounds in terms of human hearing sense.

What is claimed is:

1. A folding electronic device comprising:
an operation unit on which a plurality of information input keys are arranged;
a display unit which is integrated with said operation unit so as to be foldable, and displays at least image information;
a memory unit in which sound source data is stored;
a pair of speakers for a left channel and a right channel which are driven in a closed state in which said display unit is folded;
a detection switch which detects an open state in which said display unit is not folded or the closed state in which said display unit is folded; and
a connection switch which switches paths through which the sound source data stored in said memory unit is output to said pair of speakers on the basis of an output from said detection switch; and
a switching control unit which is directly connected to said detection switch and receives an output from said detection switch and controls switching operation of said connection switch in accordance with a detection result obtained by said detection switch,
wherein said connection switch includes a first movable contact piece which is normally connected to one of said pair of speakers, and a second movable contact piece which is normally connected to the other of said pair of speakers.

2. A device according to claim 1, further comprising:
a pair of DA converters convert the sound source data stored in said memory unit into data for the left channel and the right channel; and
a pair of amplifiers which amplify outputs from said pair of DA converters and output the outputs to said pair of speakers, respectively.

3. A device according to claim 2, wherein said connection switch is connected between said pair of amplifiers and said pair of speakers.

4. A device according to claim 2, wherein said connection switch is connected between said pair of DA converters and said pair of amplifiers.

5. A device according to claim 2, wherein each of said amplifiers comprises a balanced transformerless (BTL) amplifier having a pair of parallel-connected amplifiers.

6. A device according to claim 5, further comprising a pair of phase inversion circuits connected to one of said parallel-connected amplifiers which form said BTL amplifier corresponding to the left channel, and one of said parallel-connected amplifiers which form said BTL amplifier corresponding to the right channel.

7. A device according to claim 1, wherein when said detection switch detects the open state of said display unit, said switching control unit controls said connection switch to form a path through which an output from one of said DA converters which corresponds to the left channel is output, through the first movable contact piece, to one of said speakers which corresponds to the left channel, and to form a path through which an output from the other of said DA converters which corresponds to the right channel is output, through the second movable contact piece, to the other of said speakers which corresponds to the right channel.

8. A device according to claim 1, wherein said switching control unit detects the closed state of said display unit, said switching control unit controls said connection switch to form a path through which an output from one of said DA converters which corresponds to the left channel is output, through the second movable contact piece, to one of said speakers which corresponds to the right channel, and to form a path through which an output from the other of said DA converters which corresponds to the right channel is output, through the first movable contact piece, to the other of said speakers which corresponds to the left channel.

9. A device according to claim 1, wherein, when said display unit comprises a first display surface and a second display surface,
wherein when said device is in the open state, stereo sounds corresponding to the left channel and the right channel are provided by said switching control unit such that natural sounds are output based on the user viewing the first display surface of said display unit, and
wherein, when said device is in the closed state, stereo sounds corresponding to the left channel and the right channel are provided by said switching control unit such that natural sounds are output based on the user viewing the second display surface of said display unit.

10. A folding electronic device comprising:
an operation unit on which a plurality of information input keys are arranged;
a display unit which is integrated with said operation unit so as to be foldable, and displays at least image information, said display unit including a first display surface which is provided on an outer surface of said device and a second display surface which is provided on an inner surface of said device, the second display surface being not viewable by a user holding said device when the display unit is in the closed state and being viewable by the user holding said device when the display unit is in the open state, the first display surface being viewable by the user holding the device in either the closed state or the open state;
a memory unit in which sound source data is stored;
a pair of speakers for a left channel and a right channel which are drivable in a closed state in which said display unit is folded;

a detection switch which detects an open state in which said display unit is not folded or the closed state in which said display unit is folded; and a connection switch which switches paths through which the sound source data stored in said memory unit is output to said pair of speakers on the basis of an output from said detection switch; and a switching control unit which receives an output from said detection switch and controls switching operation of said connection switch in accordance with a detection result obtained by said detection switch, wherein when said detection switch detects the open state of said display unit, said switching control unit controls said connection switch to form a path through which an output from one of a pair of DA converters which corresponds to the left channel is output, through a first movable contact piece, to one of said speakers which corresponds to the left channel, and to form a path through which an output from the other of the pair of DA converters which corresponds to the right channel is output, through a second movable contact piece, to the other of said speakers which corresponds to the right channel, wherein said switching control unit detects the closed state of said display unit, said switching control unit controls said connection switch to form a path through which an output from one of said DA converters which corresponds to the left channel is output, through the second movable contact piece, to one of said speakers which corresponds to the right channel, and to form a path through which an output from the other of said DA converters which corresponds to the right channel is output, through the first movable contact piece, to the other of said speakers which corresponds to the left channel, wherein said device provides natural sounds in terms of human hearing sense to the user viewing the display unit irrespective as to whether or not the display unit is in the open state or in the closed state.

11. A method of providing output sounds for a folding electronic device, the device comprising:

an operation unit on which a plurality of information input keys are arranged;

a display unit which is integrated with said operation unit so as to be foldable, and displays at least image information, said display unit including a first display surface which is provided on an outer surface of said device and a second display surface which is provided on an inner surface of said device, the second display surface being not viewable by a user holding said device when the display unit is in the closed state and being viewable by the user holding said device when the display unit is in the open state, the first display surface being viewable by the user holding the device in either the closed state or the open state;

a memory unit in which sound source data is stored;

a pair of speakers for a left channel and a right channel which are drivable in a closed state in which said display unit is folded;

a detection switch which detects an open state in which said display unit is not folded or the closed state in which said display unit is folded; and a connection switch which switches paths through which the sound source data stored in said memory unit is output to said pair of speakers on the basis of an output from said detection switch; and a switching control unit which receives an output from said detection switch and controls switching operation of said connection switch in accordance with a detection result obtained by said detection switch, the method comprising:
   a) detecting by said detection switch, the open state of said display unit;
   b) when the open state of said display unit has been detected, controlling, by said switching control unit, said connection switch to form a path through which an output from one of a pair of DA converters which corresponds to the left channel is output, through a first movable contact piece, to one of said speakers which corresponds to the left channel, and to form a path through which an output from the other of the pair of DA converters which corresponds to the right channel is output, through a second movable contact piece, to the other of said speakers which corresponds to the right channel;
   c) detecting, by said detecting switch, the closed state of said display unit;
   d) when the closed state of said display unit has been detected, controlling, by said switching control, said connection switch to form a path through which an output from one of said DA converters which corresponds to the left channel is output, through the second movable contact piece, to one of said speakers which corresponds to the right channel, and to form a path through which an output from the other of said DA converters which corresponds to the right channel is output, through the first movable contact piece, to the other of said speakers which corresponds to the left channel, wherein natural sounds are provided in terms of human hearing sense to the user viewing the display unit irrespective as to whether or not the display unit is in the open state or in the closed state.

12. A method according to claim 11, wherein, when said device is in the open state, stereo sounds corresponding to the left channel and the right channel are provided by said switching control unit such that natural sounds are output based on the user viewing the first display surface of said display unit, and wherein, when said device is in the closed state, stereo sounds corresponding to the left channel and the right channel are provided by said switching control unit such that natural sounds are output based on the user viewing the second display surface of said display unit.

* * * * *